US012756308B2

(12) United States Patent
Vera et al.

(10) Patent No.: US 12,756,308 B2
(45) Date of Patent: Oct. 6, 2026

(54) PFM TRANSITION HYSTERESIS SCHEME FOR PEAK-CURRENT MODE BUCK CONVERTERS

(71) Applicants: Nexperia Technology (Shanghai) Ltd., Shanghai (CN); NEXPERIA B.V., Nijmegen (NL)

(72) Inventors: Alejandro Vera, Wylie, TX (US); Jairo Olivares, Richardson, TX (US); Amer Atrash, Dallas, TX (US)

(73) Assignees: Nexperia Technology (Shanghai) Ltd., Shanghai (CN); Nexperia B.V., Nijmegen (NL)

( * ) Notice: Subject to any disclaimer, the term of this patent is extended or adjusted under 35 U.S.C. 154(b) by 162 days.

(21) Appl. No.: 18/589,749

(22) Filed: Feb. 28, 2024

(65) Prior Publication Data

US 2025/0274044 A1 Aug. 28, 2025

(51) Int. Cl.

*H02M 3/156* (2006.01)
*H02M 1/00* (2007.01)
*H02M 1/14* (2006.01)

(52) U.S. Cl.

CPC ......... *H02M 3/156* (2013.01); *H02M 1/0025* (2021.05); *H02M 1/0032* (2021.05); *H02M 1/0009* (2021.05); *H02M 1/14* (2013.01)

(58) Field of Classification Search

CPC ............ H02M 1/0009; H02M 1/0032; H02M 1/0035; H02M 1/0025; H02M 1/14; H02M 3/156–1588

See application file for complete search history.

(56) References Cited

U.S. PATENT DOCUMENTS

| | | | | | |
|---|---|---|---|---|---|
| 2015/0028830 | A1* | 1/2015 | Chen | H02M 3/1588 | 323/271 |
| 2020/0119642 | A1* | 4/2020 | Zhang | H02M 1/14 | |
| 2022/0337162 | A1* | 10/2022 | Shen | G06F 1/28 | |
| 2023/0122410 | A1* | 4/2023 | Fan | H02M 1/0025 | 323/271 |
| 2025/0062674 | A1* | 2/2025 | Alevoor | H02M 3/158 | |

OTHER PUBLICATIONS

European Search Opinion issued by EPO in foreign child application 25 160 688.5. (Year: 2025).*

* cited by examiner

*Primary Examiner* — Fred E Finch, III
(74) *Attorney, Agent, or Firm* — Ruggiero McAllister & McMahon LLC

(57) ABSTRACT

A peak-current mode (PCM), buck converter is provided, including a slope compensation element, the PCM buck converter is arranged to detect an entering or exiting of a pulse frequency modulation (PFM), mode of operation. The slope compensation element is arranged to disable or reduce a slope compensation when the PCM buck converter detects the entering of the PFM. The slope compensation element is arranged to enable the slope compensation when the PCM buck converter detects the exiting of the PFM.

12 Claims, 3 Drawing Sheets

100

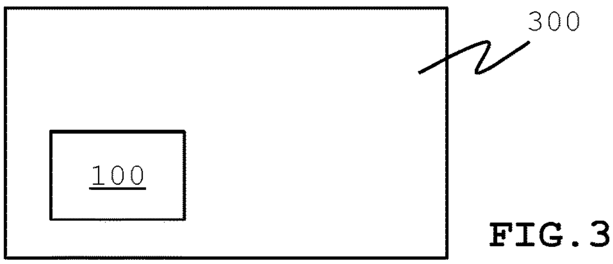
FIG.3
FIG.4
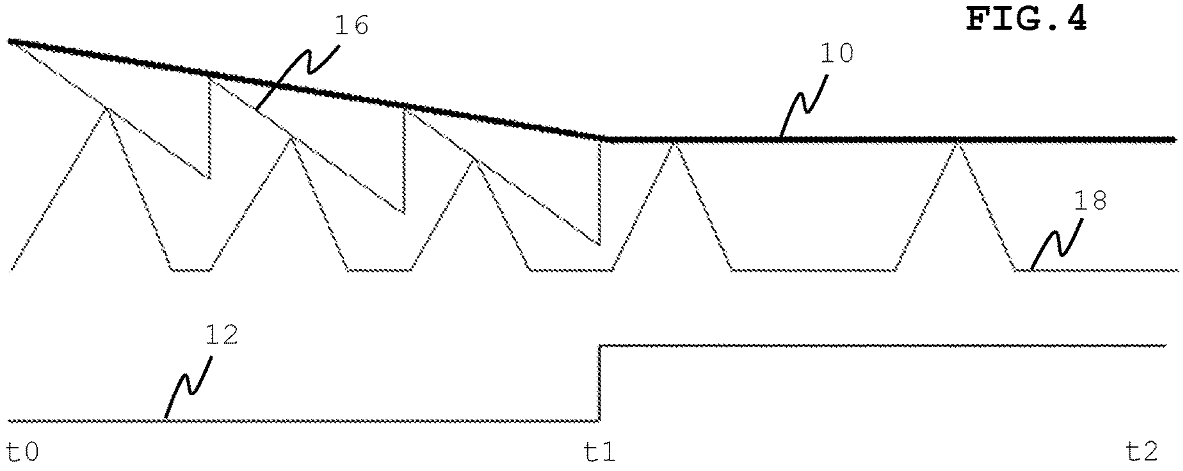
FIG.5
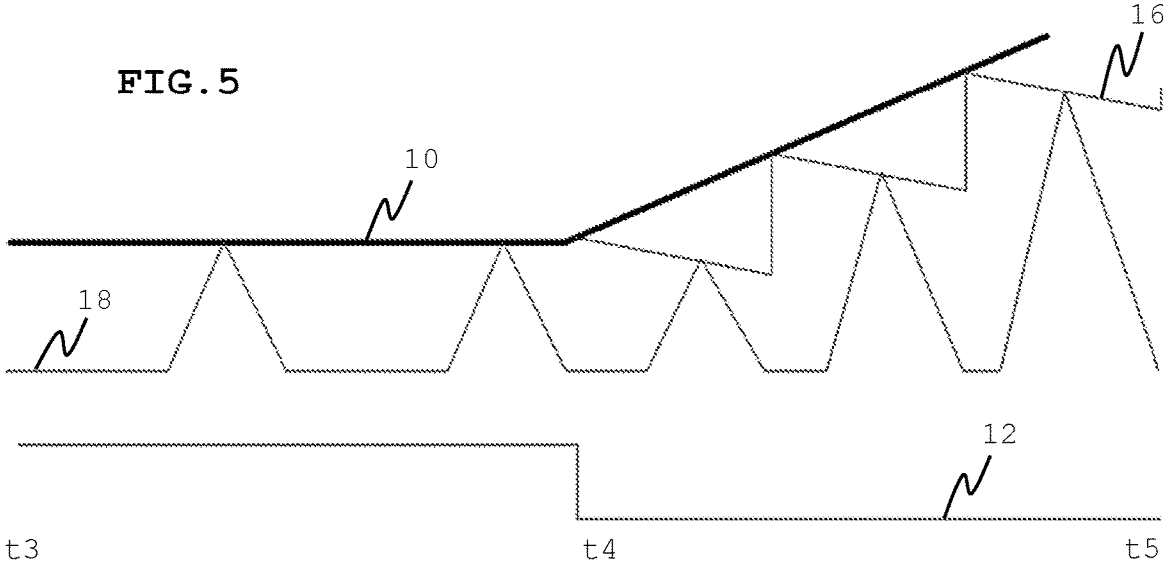

PFM TRANSITION HYSTERESIS SCHEME FOR PEAK-CURRENT MODE BUCK CONVERTERS

BACKGROUND

1. Field of the Disclosure

The present disclosure relates to buck converters, and more in particular to peak-current mode (PCM) controlled buck converters.

2. Description of the Related Art

Battery operated devices, such as personal electronic devices, robots, electric cars, industrial equipment, medical equipment and wearable devices, require a stable and consistent power source. In addition, longer battery life is desirable so high efficiency (especially during light loads) is important. Highly efficient voltage regulators may be used in these applications to provide a regulated voltage from the battery to the device while requiring less battery power to operate. In addition, display devices (such as organic light-emitting diode displays) also incorporate voltage regulators. A stable output voltage with minimal ripple is important for the proper operation of these display devices.

Switching regulators, also referred to as DC-DC converters, may be used to convert or regulate an input voltage to an output voltage. The input voltage can be greater than, less than or equal to the output voltage. If the input voltage is greater than the output voltage, the converter/regulator may be referred to as a "step-down" converter/regulator or a "buck converter". If the converter/regulator can perform both step-up and step-down functions, then it may be referred to as a "buck-boost converter".

A peak-current mode (PCM) controlled buck converter refers to a type of control strategy used in DC-DC buck converters for regulating the output voltage. In this control scheme, the converter adjusts the duty cycle of the switching transistor based on the peak-current flowing through an energy storing device, such as an inductor. This method helps to improve the dynamic response and stability of the converter. Peak-current mode control is commonly used in various power supply applications where fast transient response and good overall performance are crucial.

Generally, switching regulators include at least one power switch and one or more energy storage devices, such as an inductor and a capacitor. The power switch can be implemented using a metal-oxide-silicon field-effect transistor (MOSFET), bipolar junction transistor (BJT) or other type of power transistor. The switching regulator may include a high-side switch and a low-side switch or a single power switch and a diode. The diode can be replaced with a transistor. Operation of the switching regulator basically includes turning on the power switch to supply energy to the inductor followed by turning off the power switch resulting in the transfer of the stored energy in the inductor to a load (and an output capacitor). The switching on and off of the power switch is controlled based on the load characteristics and the energy required by the load.

The switching of the power switch can be accomplished using different modes of operation, and the switching converter may switch from one mode to the next. Continuous-conduction mode (CCM) of operation occurs where the increase in energy stored in the inductor during the on-time of the power switch is equal to the energy discharged to the output during the off-time of the power switch. Any residual energy remains stored in the inductor. During the next on-time of the power switch, energy builds from the residual energy to a point required by the load in the next switching cycle.

Another mode of operation is the discontinuous conduction mode (DCM). In this mode of operation, energy stored in the inductor during the on-time of the power switch is equal to the energy required by the load during a single switching cycle plus energy lost due to converter losses. Basically, the energy in the inductor depletes to zero before the end of the switching cycle in DCM but some residual energy remains in the inductor at the end of a switching cycle in CCM. DCM it typically used with mid-range loads, and CCM is typically used with higher-range loads.

Other modes of operation utilize feedback to vary the frequency or duty cycle of the switching cycles. For example, pulse frequency modulation (PFM) varies the switching frequency (with fixed on-time or fixed off-time) proportional to the load. In other words, as the load increases the number of on-times for a certain time period will increase. Since the switching frequency increases as the load increases, switching noise increases in a manner that may not be easily filtered. In light of this, PFM provides high efficiency and less switching noise during lighter load conditions.

Transitions from one mode to another may cause output voltage ripple, additional switching noise, loss of efficiency and/or audible noise. For example, when a PCM controlled buck converter is close to a DCM transition, and the converter has a PFM control loop for light load efficiency, it is possible for the converter to bounce between the two control loops. As the PCM and PFM control loops hand off control of the output, higher switching jitter may be observed on the switch node and a higher output ripple may result.

SUMMARY

A summary of aspects of certain examples disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects and/or a combination of aspects that may not be set forth.

The present disclosure aims to overcome the drawbacks identified in the background section. In particular, the present disclosure aims to reduce or eliminate switching jitter on the switching node of a buck converter, in particular a peak-current mode buck converter, therewith reducing or eliminating output voltage ripple and obtain a cleaner output voltage.

According to an aspect to the present disclosure, a PCM buck converter is presented. The PCM buck converter may include a slope compensation element. The PCM buck converter may be arranged to detect entering or exiting of a pulse frequency modulation, PFM, mode of operation. Hereinafter the "PFM mode of operation" may also be referred to as "PFM". The slope compensation element may be arranged to disable or reduce a slope compensation when the PCM buck converter detects the entering of the PFM. The slope compensation element may be arranged to enable the slope compensation when the PCM buck converter detects the exiting of the PFM.

In an embodiment, the PCM buck converter may further include an inductor. The PCM buck converter may be arranged to increase a peak in an inductor current through the inductor by disabling or reducing the slope compensation when detecting the entering of the PFM. The PCM buck converter may be arranged to decrease a peak in the inductor current through the inductor by enabling the slope compensation when detecting the exiting of the PFM.

In an embodiment, the PCM buck converter may further include an error amplifier (EA). The EA may be arranged to generate an EA output voltage (VCOMP). The PCM buck converter may further include a modulator. The modulator may be arranged to apply the slope compensation to the VCOMP when the slope compensation is enabled. The modulator may be arranged to stop applying the slope compensation to the VCOMP when the slope compensation is disabled.

In an embodiment, the PCM buck converter may further include a clamp circuit. The clamp circuit may be arranged to receive the VCOMP from the EA. The PCM buck converter may further include a pulse frequency modulation (PFM) comparator arranged to receive a PFM detection voltage (PFM_DET). The PFM_DET may be based on the VCOMP. The PFM comparator may be arranged to generate a PFM activation signal (PFM_ACT) by comparing the PFM_DET with a reference voltage for PFM detection (VREF_PFM_DET). The slope compensation element may be arranged to be triggered by the PFM_ACT to enable or disable the slope compensation.

In an embodiment, the clamp circuit may include a clamp amplifier arranged to receive the VCOMP from the EA. The clamp amplifier may be arranged to regulate the VCOMP to a reference voltage for PFM (VREF_PFM). The clamp circuit may include one or more transistors arranged to gain up the VREF_PFM to obtain the PFM_DET.

In an embodiment, the PCM buck converter may further include a converter oscillator. The clamp circuit may further be arranged to generate a signal to the converter oscillator for PFM frequency foldback.

According to an aspect of the present disclosure, a switching regulator is presented. The switching regulator may include one or more PCM buck converters having one or more of the above-described features.

According to an aspect of the present disclosure, a slope compensation element of a PCM buck converter is presented. The slope compensation element may be arranged to disable or reduce a slope compensation when the PCM buck converter detects the entering of a PFM mode of operation. The slope compensation element may be arranged to enable the slope compensation when the PCM buck converter detects the exiting of the PFM.

In an embodiment, the slope compensation element may be arranged to be triggered by a PFM activation signal (PFM_ACT) from a PFM comparator to enable or disable the slope compensation.

According to an aspect of the present disclosure, a clamp circuit of a PCM buck converter is presented. The clamp circuit may be arranged to receive an EA output voltage (VCOMP) from an EA. The clamp circuit may include a PFM comparator arranged to receive a PFM detection voltage (PFM_DET). The PFM_DET may be based on the VCOMP. The PFM comparator may be arranged to generate a PFM activation signal (PFM_ACT) by comparing the PFM_DET with a reference voltage for PFM detection (VREF_PFM_DET). The PFM comparator may be arranged to output PFM_ACT to a slope compensation element for triggering the slope compensation element to enable or disable a slope compensation when the PCM buck converter enters or exits a PFM mode of operation.

In an embodiment, the clamp circuit may include a clamp amplifier arranged to receive the VCOMP from the EA. The clamp amplifier may further be arranged to regulate the VCOMP to a reference voltage for PFM (VREF_PFM). The clamp circuit may include one or more transistors arranged to gain up the VREF_PFM to obtain the PFM_DET.

In an embodiment, the clamp circuit may further be arranged to generate a signal to a converter oscillator for PFM frequency foldback.

BRIEF DESCRIPTION OF THE DRAWINGS

Embodiments of the present disclosure will now be described, by way of example only, with reference to the accompanying schematic drawings in which corresponding reference symbol indicate corresponding parts, in which:

FIG. 3 is an abstract representation of a switching regulator including a PCM buck converter.

FIG. 4 is a timing diagram of signals on PFM entry.

FIG. 5 is a timing diagram of signals on PFM exit.

The figures are intended for illustrative purposes only, and do not serve as restriction of the scope of the protection as laid down by the claims.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the present disclosure is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present disclosure should be or are in any single example of the present disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same example.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure. Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

Figure 1:
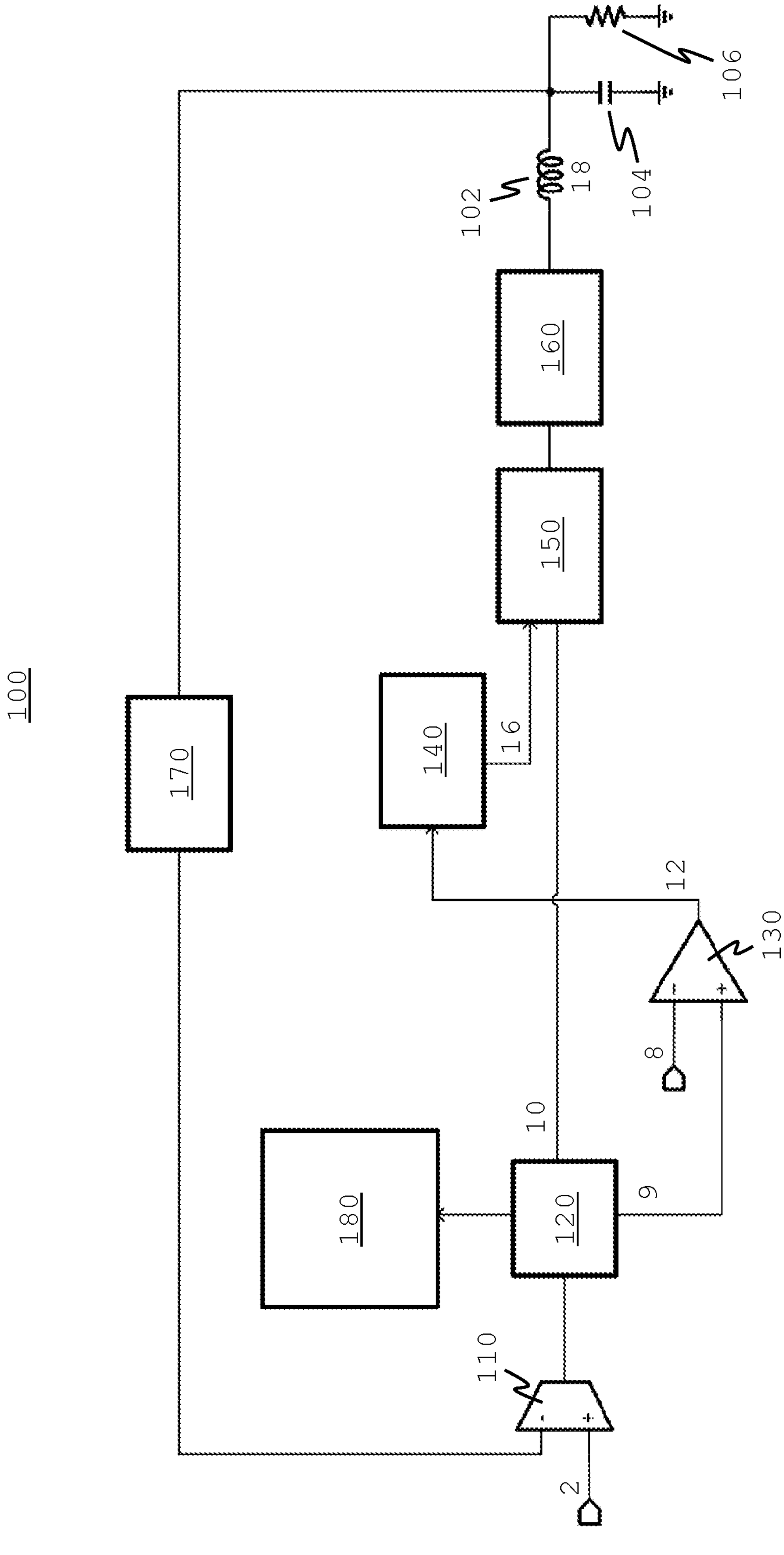
FIG. 1 shows an example high-level schematic of a PCM buck converter.

FIG. 1 shows an example high-level schematic of a PCM buck converter 100 of an example embodiment of the present disclosure. The PCM buck converter 100 may include an error amplifier (EA) 110, a clamp circuit 120, a PFM comparator 130, a slope compensation element 140, a modulator 150, a power stage element 160, a feedback gain element 170, a converter oscillator 180, an inductor 102, a capacitor 104 and a resistor 106. Input and output signals are indicated with reference signs 2-18, including a loop reference voltage (Loop VREF) 2, a reference voltage for PFM detection (VREF_PFM_DET) 8, a PFM detection voltage (PFM_DET) 9, an EA output voltage (VCOMP) 10, a PFM activation signal (PFM_ACT) 12, a slope compensation voltage 16 and an inductor current 18.

The operation of a buck converter typically involves the charging and discharging of the inductor 102. The peak-current mode control scheme specifically monitors the peak-current flowing through the inductor 102. The peak inductor current 18 may be compared with a reference voltage and an error signal may be generated based on the comparison. The error signal may be fed into the EA 110, and compensation networks may be employed to stabilize the control loop and ensure good transient response and stability. The EA output may be used to modulate the width of the pulses in a pulse width modulation (PWM) signal that drives the power switch (e.g., a MOSFET) in the buck converter 100. The modulated PWM signal may control the on and off times of the power switch. During the on-time energy may be stored in the inductor 102 and during the off-time this energy may be transferred to the output capacitor 104 and load 106. By adjusting the duty cycle of the PWM signal based on the peak inductor current 18, the PCM buck converter 100 may regulate the output voltage.

Figure 2:
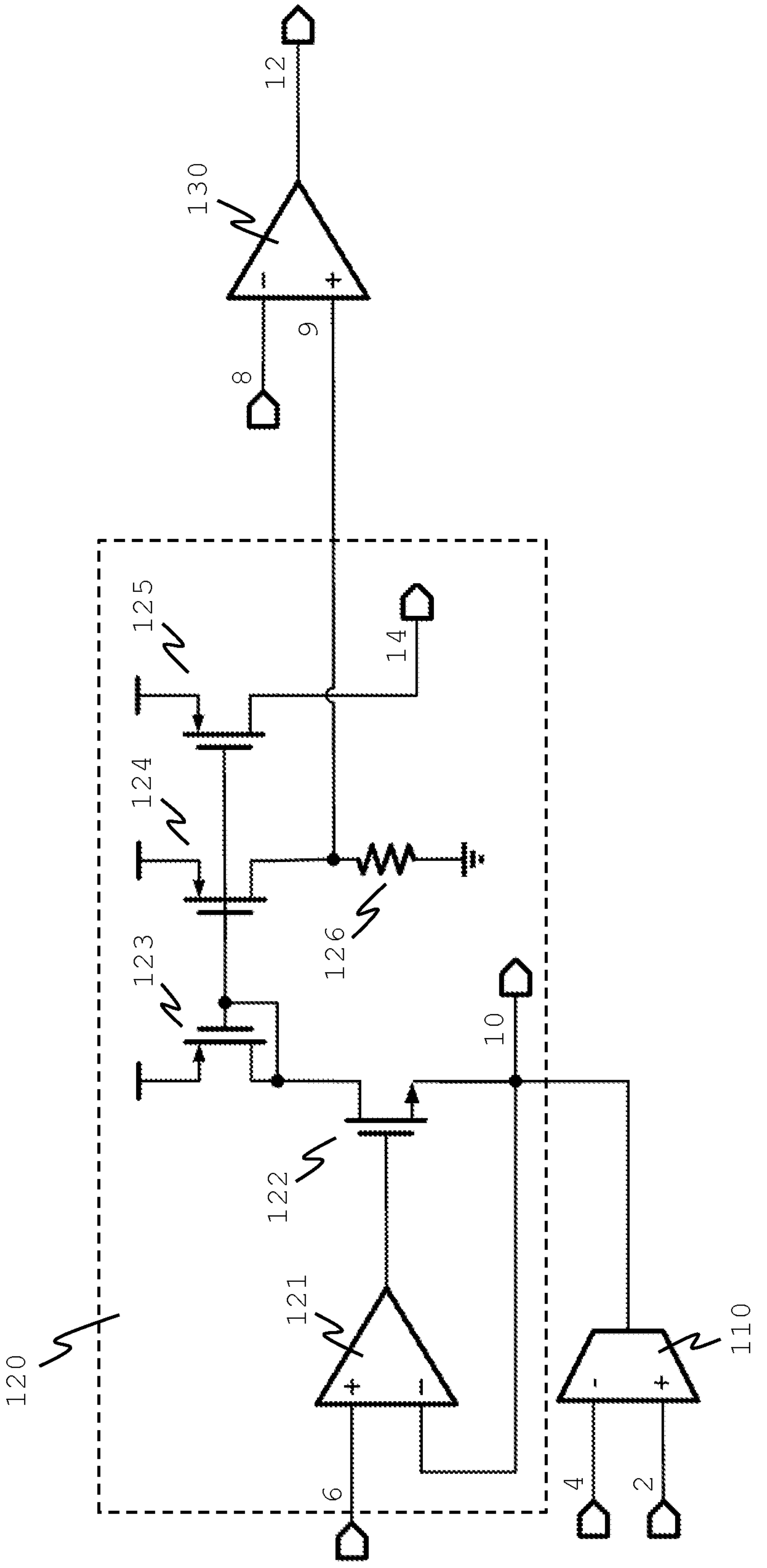
FIG. 2 shows an example embodiment of a clamp circuit of the PCM buck converter of FIG. 1.

An example embodiment of the clamp circuit 120 is shown in more detail in FIG. 2. In FIG. 2, the EA 110, the clamp circuit 120 and the PFM comparator 130 of FIG. 1 are shown. The clamp circuit 120 may include a clamp amplifier 121, transistors 122-125 and a further resistor 126. In FIG. 2, input and output signals are shown for the Loop VREF 2, a feedback voltage (FB) 4, a reference voltage for PFM (VREF_PFM) 6, the VREF_PFM_DET 8, the PFM_DET 9, the VCOMP 10, the PFM_ACT 12, and a signal 14 to the converter oscillator 180 for PFM frequency foldback.

With reference to FIG. 1, the solution of the present disclosure introduces a PFM transition hysteresis to the converter loop of a buck converter, such as the PCM buck converter 100, by enabling and disabling slope compensation 16 when the EA 110 of the buck converter 100 enters and exits PFM. When entering PFM, slope compensation 16 may be shut off or reduced (preferably quickly), resulting in the inductor current peak through the inductor 102 to increase (typically slightly). This helps push the EA 110 deeper into PFM. Conversely, when exiting PFM, slope compensation 16 may be added (preferably abruptly), lowering the inductor current peak and forcing the EA 110 out of PFM faster.

The EA 110 may clamp to a minimum voltage (e.g., at 150 mA; note that when VCOMP voltage is clamped, it necessarily follows that the peak inductor current will also be clamped) and detect the strength of the clamping (typically in microamperes). As the clamping strength of the EA 110 increases, the current is gained up by the PFM gain and used to slow down the main converter oscillator 180. Hereto, the clamp circuit 120 may analyze the output of the EA 110 and trigger the slope compensation element 140 via the PFM comparator 130 (through PFM_ACT signal 12). The PFM_ACT signal 12 may be used to enable and disable slope compensation 16, which modulates the inductor peak-current 18 through the inductor 102 as well.

The PFM_ACT signal 12 may be implemented as a two-level signal, e.g., having a high level at 5V and a low level at 0V. It will be understood that any other voltage levels may be used for high and low signals. When PFM_ACT 12 is high, slope compensation 16 may be disabled or reduce substantially, allowing a higher peak. When PFM_ACT 12 is low, slope compensation 16 may be (re-)enabled or increased. This introduces hysteresis at the transition between PCM and PFM due to the sudden change in inductor current peak, pushing the EA control output away from the boundary faster. It will be understood that the compensation element 140 may be implemented to react to the PFM_ACT signals reversely, i.e., with PFM_ACT=high enabling slope compensation 16 and PFM_ACT=low disabling slope compensation 16.

With reference to FIG. 2, the VREF_PFM_DET signal 8 may be used at the PFM comparator 130 to detect the clamping current of the clamp amplifier 121 when trying to regulate the EA output voltage VCOMP 10. As the EA 110 tries to drive VCOMP 10 lower, the clamp amplifier 121 will regulate VCOMP 10 to VREF_PFM 6 (i.e., the minimum VCOMP 10 voltage allowed).

In the example of FIG. 2, the current that is used to clamp may be gained up through the PMOS mirrors 122-125 and the further resistor 126 and detected via the PFM comparator 130. The gain obtained by the transistors 122-125 may be adjustable to set any sensitivity desired. Thus, a copy of the clamping current, which may be provided as the PFM_DET 9 to the PFM comparator 130, may be the main mechanism behind the PFM frequency foldback loop as controlled through the signal 14.

Once PFM_ACT 12 is asserted (e.g., PFM_ACT is high), the slope compensation 16 may be disable or (greatly) reduced in the modulator 150. This may provide the immediate hysteresis the loop requires to prevent it from parking in that region. Once the peak is (drastically) increased, the EA 110 will try to drive VCOMP 10 harder down, which the clamp amplifier 121 will prevent, but sends more current to the frequency foldback mechanism (through signal 14) in the converter oscillator 180.

When the PFM condition is exited, the clamp amplifier 121 stops providing current to regulate VCOMP 10. This in turn stops the current into the further resistor 126 tied to the PFM comparator 130, which de-asserts the PFM comparator 130. When that happens, slope compensation 16 may be turned on again. Once the peak is (drastically) reduced, the EA 110 will try to drive VCOMP 10 harder up, moving farther away from the boundary.

Compared to known PCM buck converters, the solution of the present disclosure may be simpler to build and safer with regards to jumping in and out of the various control schemes. Moreover, the PCM buck converter of the present disclosure may reduce jitter and output voltage ripple more, as the presented solution does not allow a region of constantly fluctuating inductor energy pulses and frequency. That makes the solution more deterministic with regards to transient response on the system.

The PCM buck converter of the present disclosure, such as PCM buck converter 100, may be used in a switching regulator 300, such as abstractly shown in FIG. 3. The solution of the present disclosure is applicable to various forms of switching regulators that in some form regulate the inductor current 18.

General timing diagrams of PFM entry (FIG. 4) and of PFM exit (FIG. 5) show the effect of the slope compensation 16 on the inductor current 18.

In FIG. 4, at time t0 the PFM_ACT signal 12 is low and the slope compensation is enabled. When entering PFM at time t1, the PFM_ACT signal 12 becomes high and the slope compensation 16 is shut off or reduced quickly, causing the peaks in inductor current 18 to increase after t1. This helps push the EA 110 deeper into PFM.

Conversely, in FIG. 5, at time t3 the PFM_ACT signal 12 is high and the slope compensation is disabled. When exiting PFM at time t4, the PFM_ACT signal becomes low and the slope compensation 16 is added (abruptly), lowering the peak in inductor current 18 after t4 and forcing the EA 110 out of PFM faster.

Other variations to the disclosed embodiments can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope thereof.

The invention claimed is:

1. A peak-current mode (PCM) buck converter comprising:
- a slope compensation element; and
- an inductor;
- wherein the PCM buck converter is arranged to detect entering or exiting of a pulse frequency modulation (PFM) mode of operation and introduce PFM transition hysteresis into a convertor loop of the buck converter by a sudden change in a peak of an inductor current by enabling and disabling slope compensation,
- wherein the slope compensation element is arranged to disable or greatly reduce a slope compensation when the PCM buck converter detects the entering of the PFM,
- wherein the PCM buck converter is arranged to increase the peak in an Inductor current through the inductor by disabling or greatly reducing the slope compensation when detecting the entering of the PFM,
- wherein the slope compensation element is arranged to enable the slope compensation when the PCM buck converter detects the exiting of the PFM, and
- wherein the PCM buck converter is arranged to decrease the peak in the inductor current through the inductor by enabling the slope compensation when detecting the exiting of the PEM.

2. The PCM buck converter according to claim 1, further comprising:
- an error amplifier (EA) arranged to generate an EA output voltage (VCOMP), and
- a modulator arranged to apply the slope compensation to the VCOMP when the slope compensation is enabled and arranged to stop applying the slope compensation to the VCOMP when the slope compensation is disabled.

3. The PCM buck converter according to claim 2, further comprising:
- a clamp circuit arranged to receive the VCOMP from the EA,
- a pulse frequency modulation (PFM) comparator arranged to receive a PFM detection voltage (PFM_DET), wherein the PFM_DET is based on the VCOMP,
- wherein the PFM comparator is arranged to generate a PFM activation signal (PFM_ACT), by comparing the PFM_DET with a reference voltage for PFM detection (VREF_PFM_DET), and
- wherein the slope compensation element is arranged to be triggered by the PFM_ACT to enable or disable the slope compensation.

4. The PCM buck converter according to claim 3, wherein the clamp circuit comprises a clamp amplifier arranged to receive the VCOMP from the EA and arranged to regulate the VCOMP to a reference voltage for PFM (VREF_PFM), and wherein the clamp circuit comprises one or more transistors arranged to gain up the VREF_PFM to obtain the PFM_DET.

5. The PCM buck converter according to claim 4, further comprising a converter oscillator, and wherein the clamp circuit is further arranged to generate a signal to the converter oscillator for PFM frequency foldback.

6. The PCM buck converter according to claim 3, further comprising a converter oscillator, and wherein the clamp circuit is further arranged to generate a signal to the converter oscillator for PFM frequency foldback.

7. A switching regulator comprising one or more PCM buck converters according to claim 2.

8. A switching regulator comprising one or more PCM buck converters according to claim 1.

9. A slope compensation element of a peak-current mode (PCM) buck converter,
- wherein the slope compensation element is arranged to disable or greatly reduce a slope compensation when the PCM buck converter detects an entering of a pulse frequency modulation (PFM) mode of operation, wherein the slope compensation element is arranged to enable the slope compensation when the PCM buck converter detects an exiting of the PFM mode of operation,
- wherein enabling and disabling the slope compensation introduces PFM transition hysteresis into a convertor loop of the buck converter by a sudden change in a peak of an inductor current of the buck converter, and
- wherein the slope compensation element is arranged to be triggered by a PFM activation signal (PFM_ACT) from a PFM comparator to enable or disable the slope compensation.

10. A clamp circuit of a peak-current mode (PCM) buck converter,
- wherein the clamp circuit is arranged to receive an error amplifier (EA) output voltage (VCOMP) from an EA,
- wherein the clamp circuit comprises a pulse frequency modulation (PFM) comparator arranged to receive a PFM detection voltage (PFM_DET), and wherein the PFM_DET is based on the VCOMP,
- wherein the PFM comparator is arranged to generate a PFM activation signal (PFM_ACT) by comparing the PFM_DET with a reference voltage for PFM detection (VREF_PFM_DET), wherein the PFM comparator is arranged to output PFM_ACT to a slope compensation element for triggering the slope compensation element to enable or disable a slope compensation when the PCM buck converter enters or exits a pulse frequency modulation (PFM) mode of operation so that the PCM buck converter introduces PFM transition hysteresis into a convertor loop of the buck converter by a sudden change in a peak of an inductor current by enabling and disabling the slope compensation, and wherein the clamp circuit comprises a clamp amplifier arranged to receive the VCOMP from the EA and arranged to regulate the VCOMP to a reference voltage for PFM (VREF_PFM), and wherein the clamp circuit comprises one or more transistors arranged to gain up the VREF_PFM to obtain the PEM_DET.

11. The clamp circuit according to claim 10, wherein the clamp circuit is further arranged to generate a signal to a converter oscillator for PFM frequency foldback.

12. A clamp circuit of a peak-current mode (PCM) buck converter, wherein the clamp circuit is arranged to receive an error amplifier (EA) output voltage (VCOMP) from an EA, wherein the clamp circuit comprises a pulse frequency modulation (PFM) comparator arranged to receive a PFM detection voltage (PEM_DET), and wherein the PFM_DET is based on the VCOMP, wherein the PFM comparator is arranged to generate a PFM activation signal (PEM_ACT) by comparing the PEM_DET with a reference voltage for PEM detection (VREF_PFM_DET), wherein the PFM comparator is arranged to output PFM_ACT to a slope compensation element for triggering the slope compensation element to enable or disable a slope compensation when the PCM buck converter enters or exits a pulse frequency modulation (PFM) mode of operation so that the PCM buck converter introduces PEM transition hysteresis into a convertor loop of the buck converter by a sudden change in a peak of an inductor current by enabling and disabling the slope compensation, and wherein the clamp circuit is further arranged to generate a signal to a converter oscillator for PFM frequency foldback.

* * * * *